United States Patent [19]
Ouchi

[11] Patent Number: 5,915,111
[45] Date of Patent: Jun. 22, 1999

[54] MULTI-FUNCTION CONCURRENT PROCESSING DEVICE ALLOWING PRIORITIZATION OF CONTROL PROGRAMS

[75] Inventor: Tetsuya Ouchi, Tajimi, Japan

[73] Assignee: Brother Kogyo Kabushiki Kaisha, Nagoya, Japan

[21] Appl. No.: 08/924,951

[22] Filed: Sep. 8, 1997

[30] Foreign Application Priority Data

Sep. 9, 1996 [JP] Japan .................................. 8-261407

[51] Int. Cl.$^6$ ........................................................ G06F 9/46
[52] U.S. Cl. .................................................................. 395/677
[58] Field of Search .................................. 395/677, 670

[56] References Cited

U.S. PATENT DOCUMENTS 5,666,584  9/1997  Akashi et al. .............................. 399/9
5,694,604  12/1997  Reiffin ..................................... 395/677

Primary Examiner—Thomas M. Heckler
Attorney, Agent, or Firm—Oliff & Berridge, PLC

[57] ABSTRACT

A multi-function concurrent processing device is capable of performing a plurality of functions by using time sharing methods to concurrently process at least two of a plurality of control programs, which correspond to the plurality of functions, the plurality of functions being assigned with a priority order. The multi-function concurrent processing device includes: an operation panel commonly used for the plurality of functions, the operation panel having a predetermined key commonly used for the plurality of functions; a determination unit that determines whether at least two of the plurality of control programs are being concurrently processed; and a key validation unit that, when the predetermined key of the operation panel is operated while the determination unit determines that at least two of the plurality of control programs are being concurrently processed, validates commands from the predetermined key only for a control program of a function having a highest priority in the priority order than any other function of the at least two of the plurality of control programs.

12 Claims, 5 Drawing Sheets

MULTI-FUNCTION CONCURRENT PROCESSING DEVICE ALLOWING PRIORITIZATION OF CONTROL PROGRAMS

BACKGROUND OF THE INVENTION

1. Field of the Invention

The present invention relates to a multi-function concurrent processing device capable of concurrently processing a plurality of control programs using time sharing methods.

2. Description of the Related Art

Recently, many electronic devices, such as information processing devices, include an internal computer of some sort. In order to more rapidly process a plurality of functions, such as a computation process function or a process function for inputting and outputting information, one such electronic device uses a type of multi-function concurrent processing called multi-processing to concurrently process the plurality of functions. The electronic device includes a plurality of central processing units connected in series. In order to perform the plurality of functions, an operation system with a concurrent process management system uses the CPUs to separately execute a plurality of control programs that correspond to the plurality of functions.

It should be noted that other electronic devices use time sharing methods to more rapidly process a plurality of functions. During time sharing processes, a single processing unit executes a plurality of control programs one after the other in a predetermined order each time a short predetermined processing time elapses.

Electronic devices using multi-processing methods and time sharing methods described above are provided with a keyboard having a stop key for stopping processes presently being executed. However, when a plurality of functions are executed simultaneously, the user must input a predetermined job number or a unit name so that the control unit of the electronic device can distinguish which function is to be stopped. After the user inputs the job number or the unit name, he or she operates the stop key and the control unit stops execution of the control program corresponding to that function.

However, in electronic devices that use multi-processing or time sharing methods to simultaneously and concurrently execute a plurality of functions, when a user wishes to stop one of the plurality of functions being executed simultaneously, he or she must enter the job number or the unit name corresponding to each function he or she wishes to stop. Therefore, stopping a desired function presently being executed is a troublesome process.

SUMMARY OF THE INVENTION

It is an objective of the present invention to overcome the above-described problem and to provide an electronic device that validates commands from a predetermined key by giving priority only to a control program for a function with high priority. It is also an objective of the present invention to enable validation of commands by a user merely manipulating the predetermined key on the operation panel even while a plurality of control programs are being concurrently executed.

In order to achieve the above-described objectives, a multi-function concurrent processing device according to the present invention is capable of performing a plurality of functions by using time sharing methods to concurrently process at least two of a plurality of control programs, which correspond to the plurality of functions, the plurality of functions being assigned with a priority order. The multi-function concurrent processing device includes: an operation panel commonly used for the plurality of functions, the operation panel having a predetermined key commonly used for the plurality of functions; a determination unit that determines whether at least two of the plurality of control programs are being concurrently processed; and a key validation unit that, when the predetermined key of the operation panel is operated while the determination unit determines that at least two of the plurality of control programs are being concurrently processed, validates commands from the predetermined key only for a control program of a function having a highest priority in the priority order than any other function of the at least two of the plurality of control programs.

With this configuration, because the determination unit determines whether at least two control programs of the plurality of programs are being concurrently executed, when the predetermined key, which is commonly used for the plurality of function, and which is one of a plurality of keys provided to the operation panel, is manipulated while the determination unit determines that at least two control programs are being concurrently executed, then the key validation unit validates only commands from the predetermined key related to the control program corresponding to the function having a higher priority in the priority order than any other functions. In other words, by merely manipulating the predetermined key on the operation panel while the plurality of control programs are concurrently being processed, commands from the predetermined key can be validated giving priority to the control programs corresponding to functions having higher priority.

According to another aspect of the present invention, the electronic device is capable of performing a facsimile function and also at least one of a print function and a scanner function. The facsimile function is given higher priority than the other functions. With this configuration, when the facsimile function, the print function, and the scanner function are simultaneously and concurrently processed, when the facsimile function and the print functions are concurrently processed, or when the facsimile function and the scanner function are concurrently processed, then because the facsimile function, which is the main function of the multi-function concurrent processing electronic device according to this aspect of the present invention, is set to a higher priority than the print function or the scanner function, which are supplementary functions, therefore, commands from the predetermined key relating to the control program corresponding to the facsimile function are validated with higher priority than commands relating to the control programs corresponding to either the print function or the scanner function.

According to another aspect of the present invention, the predetermined key is a key for stopping operations presently being processed. Therefore, only processes related to a control program corresponding to a function having higher relative priority can be stopped by a stop command from the predetermined key.

According to another aspect of the present invention, a single CPU simultaneously executes a plurality of functions by concurrently processing a plurality of control programs using time sharing methods. In this case, when the predetermined key on the operation panel is manipulated, then commands from the predetermined key can be validated and moreover, a control program whose commands are validated can be easily performed according to priority of its corresponding function.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

An electronic device according to a preferred embodiment of the present invention will be described while referring to the accompanying drawings wherein like parts and components are designated by the same reference numerals to avoid duplicating description.

Figure 1:
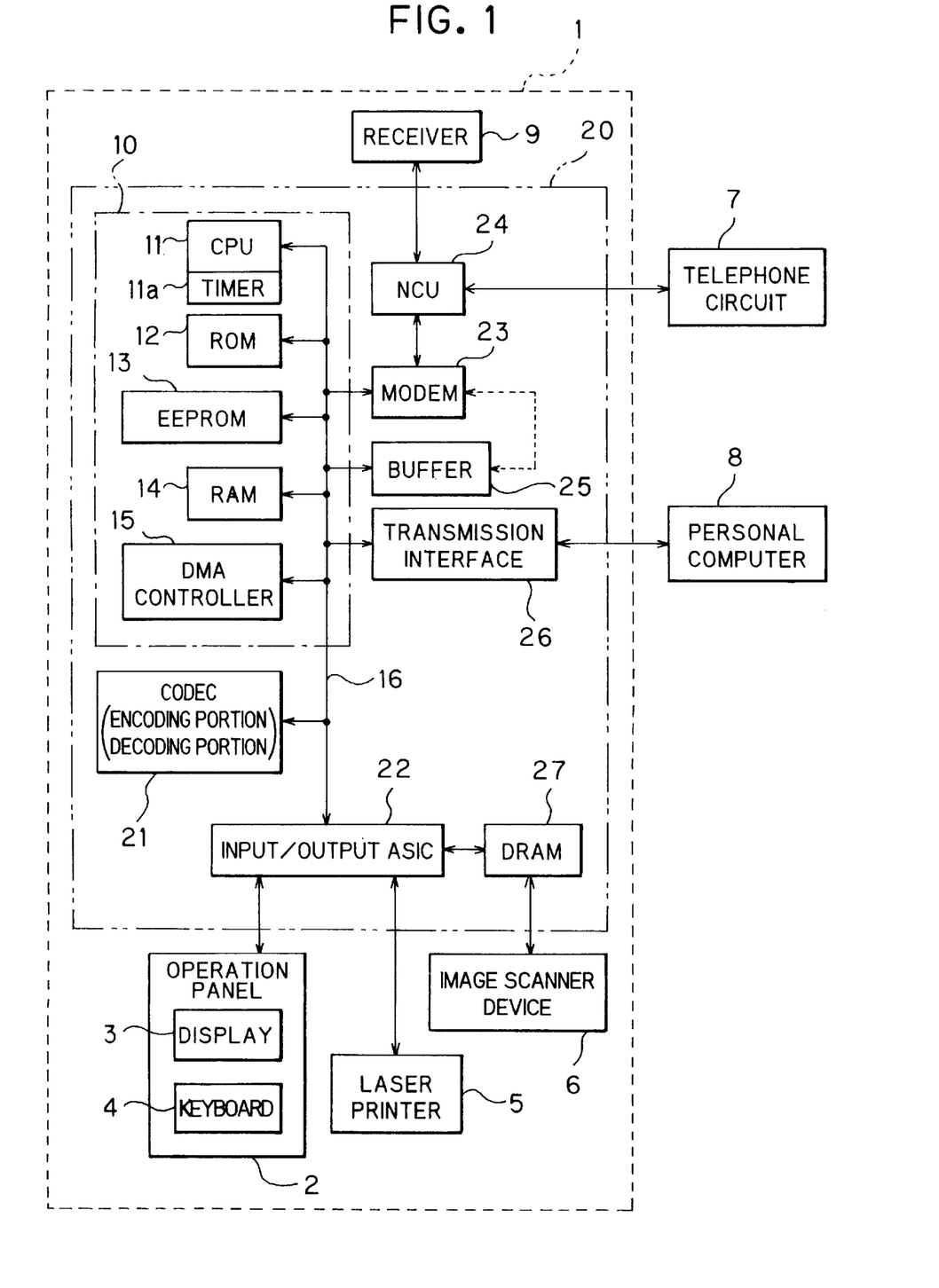
FIG. 1 is a block diagram showing electrical configuration of a multi-function peripheral device according to an embodiment of the present invention.

The present embodiment describes the present invention applied to a multi-function information processing device 1. As shown in FIG. 1, the multi-function information processing device 1 includes: a control unit 20 having a single computer 10, an operation panel 2, a laser printer 5, and an image scanner 6. The operation panel 2, the laser printer 5, and the image scanner 6 are connected to the control unit 20.

The computer 10 includes: a CPU 11, a ROM 12, an EEPROM 13, a RAM 14, and a direct memory access (DMA) controller 15. The EEPROM 13, the RAM 14, and the DMA controller 15 are connected to the CPU 11 by a common bus 16, including a data bus and the like. A timer 11a is provided internally to the CPU 11. The common bus 16 is connected to a variety of components, including: a coder-decoder (CODEC) 21 having an encoder portion for encoding image data to be transmitted and a decoder portion for decoding received data; an input/output application specific integrated circuit (ASIC) 22 for inputting and outputting data and made from a hard logic circuit; a modem 23 for performing facsimile transmission; a buffer 25; and a transmission interface 26 connected to an external personal computer 8 via a connection cable. A network controller unit (NCU) 24 is connected to the modem 23.

A telephone circuit 7 and a receiver 9 are connected to the NCU 24. Further, the operation panel 2 and the laser printer 5 are connected to the input/output ASIC 22. The operation panel 2 has a display 3 and a keyboard 4. A dynamic RAM (DRAM) 27 is connected to the input/output ASIC 22. The DRAM 27 is for temporarily storing two to three lines worth of dot data retrieved using the image scanner 6. The image scanner 6 is connected to the input/output ASIC 22 via the DRAM 27.

The multi-function information processing device 1 is provided with a facsimile function including: a normal facsimile function, wherein facsimile data received by the modem 23 can be printed using the laser printer 5 and wherein image data retrieved from an original document using the image scanner 6 can be transmitted over the telephone circuit 7; and also a data transmission function, by which data received by the modem 23 can be transmitted to the personal computer 8 over the connection cable or data from the computer 8 can be transmitted over the telephone circuit 7.

The ROM 12 stores a variety of control programs, such as: a control program for executing the facsimile function, for example, for controlling transmission and reception of facsimile data between the multi-function information processing device 1 and a remote facsimile device (not shown in the drawings) via the telephone circuit 7; a control program for executing a copy function for recording images retrieved from a document by the image scanner 6; a control program for executing a print data recording function for using the laser printer 5 to record print data received from the external personal computer 8; a control program for executing a scanner function for transmitting, to the external personal computer 8, image data retrieved from the document by the image scanner 6; and a key input management control program to be described later.

The keyboard 4 is provided with a plurality of keys, including a plurality of function keys, such as: a normal transmission key and a memory transmission key, which relate to the facsimile function; number keys for dialing telephone numbers and the like; a copy key relating the copy function; a print key relating to the print function; and a switch key for bringing the processing device 1 on line and off line with respect to the personal computer 8. The keyboard 4 is also provided with keys commonly used for all of the plurality of different functions. Examples of such commonly used keys include: a start key provided for commanding start of operations of the functions; a stop key provided for commanding processes of the functions to be stopped; and a ten-key pad for inputting numbers relating to the different functions. For example the ten-key pad is used both for the facsimile function and for the copy function. For the facsimile function, the ten-key pad is used to enter a telephone number of a remote unit to which a facsimile message is to be transmitted. For the copy function, the ten-key pad is used to enter how many times an original is to be copied.

The functions of the multi-function information processing device 1 have a priority order. Each function of the multi-function information processing device 1 is assigned a priority level in the priority order. The facsimile function is the main function of the multi-function information processing device 1. The other functions, such as the copy function, the print function, and the scanner function, are supplementary functions. Therefore, the facsimile function, which is the main function, is assigned a higher priority than priority set for the supplementary functions such as the copy function, the print function, and the scanner function. Operations relating to the functions of the multi-function information processing device 1 are performed based on the priority order of the functions, wherein the facsimile function is given first priority, the copy function is given the second priority, and the print and scanner functions are given the next priority.

The control program for executing the facsimile function includes a variety of different routines, such as: an idling routine for constantly detecting change in a condition of the multi-function information processing device 1; an image reception recording routine for using the laser printer 5 to record facsimile data received over the telephone circuit 7; an image retrieval transmission routine for retrieving image information from an original document using the image scanner 6 and transmitting image information as facsimile data over the telephone circuit 7; and a memory transmission routine for retrieving, from the RAM 14, image information retrieved using the image scanner 6 and stored in the RAM 14 and transmitting the image information to an external device.

The CPU 11 of the multi-function information processing device 1 uses time sharing methods and so is able to receive a timer interrupt at a predetermined timing determined by the internal timer 11a. As a result, the CPU 11 is able to consecutively switch, at the predetermined timing, between execution of the different control programs, which correspond to the plurality of functions. For example, when the control program for the memory transmission routine of the facsimile function is concurrently processed with the control program for executing the scanner function or when the image retrieval transmission routine of the image transmission function is concurrently processed with the control program for executing the print function, then each time the CPU 11 receives a timer interrupt signal from the timer 11a at a timing of, for example, each 1/60 of a second, then the CPU 11 switches execution, in the former case, from executing the memory transmission routine to executing the control program for executing the scanner function or vice versa or, in the later case, from executing the image retrieval transmission routine to executing the control program for executing the print function or vice versa. In this way, the plurality of functions can be simultaneously executed.

Figure 4:
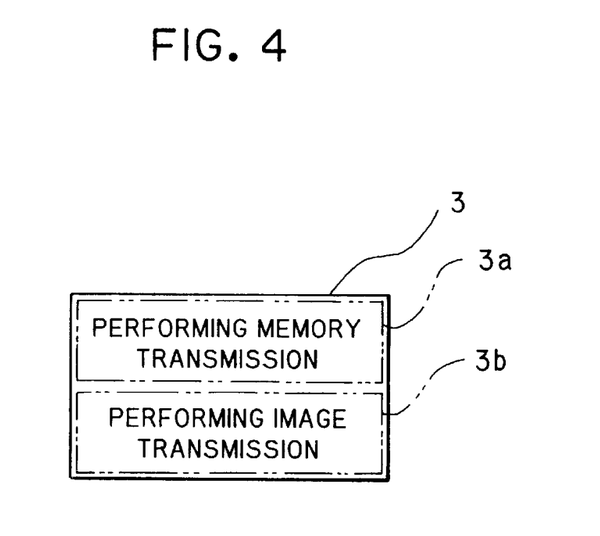
FIG. 4 is a schematic view showing a display while image and memory transmission processes are being processed concurrently.

As described previously, when the control program for the memory transmission function and control program for the scanner function are concurrently processed, a variety of messages relating to execution of the memory transmission function of the facsimile function, which is the main function, are displayed on the upper half of the display 3 in a display region 3a as shown in FIG. 4 and a variety of messages relating to execution of the scanner function, which is a supplementary function, are displayed on the lower half of the display 3 in a display region 3b.

The EEPROM 13 stores, in a changeable manner, a variety of setting modes used during the facsimile function and also stores telephone numbers and the like of a plurality of remote facsimile devices. The RAM 14 includes: a reception data memory for storing data received from an incoming facsimile message; a recording data memory for storing dot image data produced by developing the received data into a form recordable using the laser printer 5; and a variety of memories and buffers required to execute control programs for performing a plurality of functions, such as the facsimile function and the copy function.

Next, an explanation will be provided for routine switching processes according to the present invention. The routine switching processes are performed in the same manner as in subroutine calling performed during conventional interrupt processes. At a time sharing switching timing determined by the internal timer 11a, a variety of data for indicating the location of the next instruction to be interpreted for a routine presently being performed is stored in a predetermined stack memory of the RAM 14. Examples of such data includes program counter (PC) data and status register (SR) data relating to process control of the CPU 11. Also at the time sharing switching timing, the routine execution is switched to perform another routine and PC data and SR data relating to the other routine is retrieved from the corresponding exclusive stack memory of the RAM 14. In this way, routine switching processes are performed by switching storage of PC data and SR data relating to operations of the CPU 11.

Figure 2:
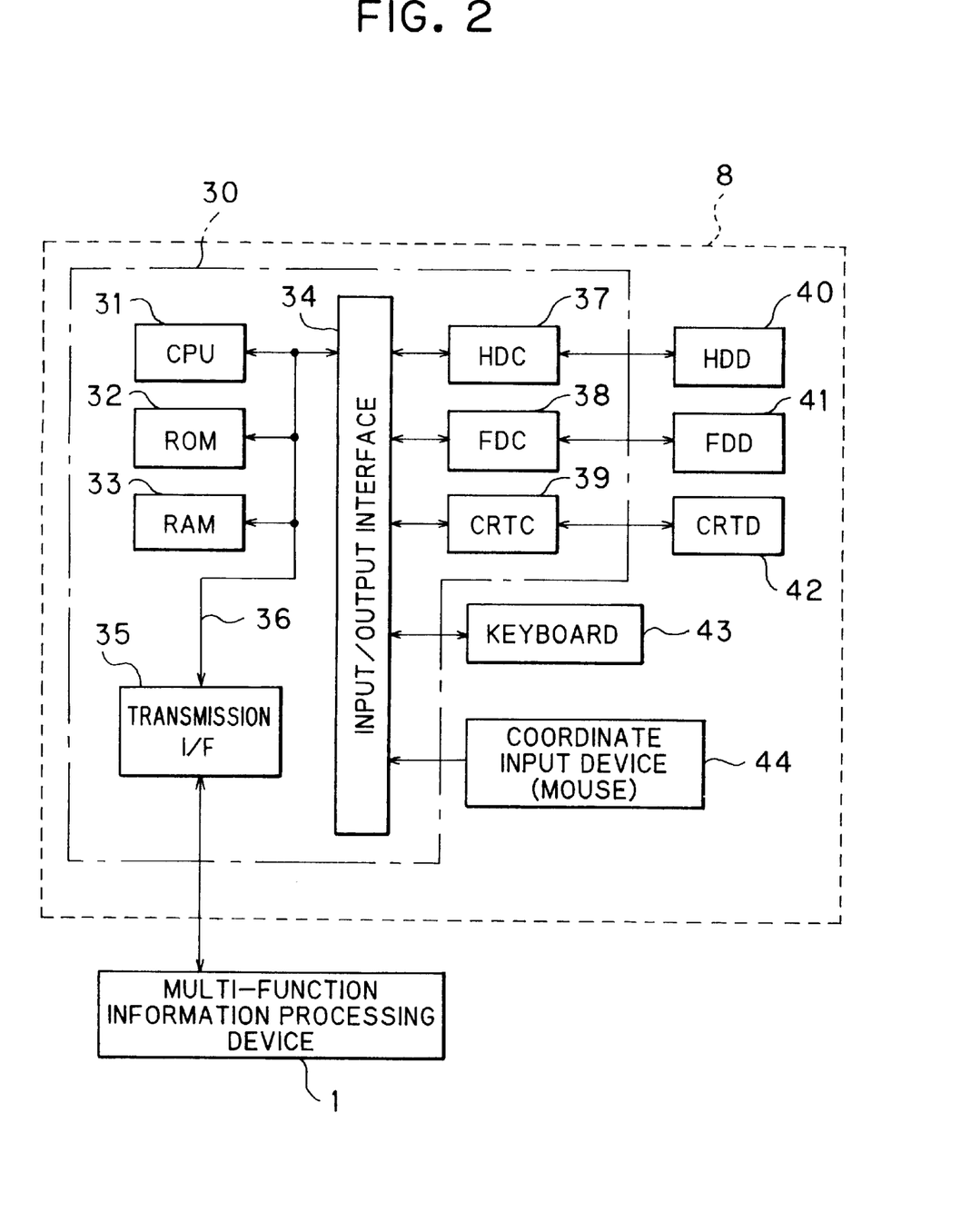
FIG. 2 is a block diagram showing electrical configuration of a personal computer while the personal computer is connected to the multi-function peripheral device.

Next, an explanation will be provided for the external personal computer 8 while referring to FIG. 2. The external personal computer 8 includes a control device 30, which is connected to a variety of components, such as: a hard disk drive device (HDD) 40, a floppy disk drive device (FDD) 41, a CRT display (CRTD) 42, a keyboard 43, and a coordinate input device (mouse) 44. The control device 30 includes a CPU 31, a ROM 32, a RAM 33, an input/output interface 34, and a transmission interface 35, all connected by a common bus 36 including a data bus.

The input/output interface 34 is connected to a variety of components, such as: a hard disk drive controller (HDC) 37 for controlling drive of the hard disk drive device 40; a floppy disk drive controller (FDC) 38 for controlling drive of the floppy disk drive device 41; and a CRT controller (CRTC) 39 for controlling the drive of the CRT display 42. The multi-function information processing device 1 is connected to the transmission interface 35 via the connection cable.

With this configuration, a variety of processes can be performed. For example, print data prepared in the external personal computer 8 can be transmitted to the multi-function information processing device 1 and recorded on the laser printer 5. Also, image data retrieved by the image scanner 6 can be inputted to the external personal computer 8.

Figure 3:
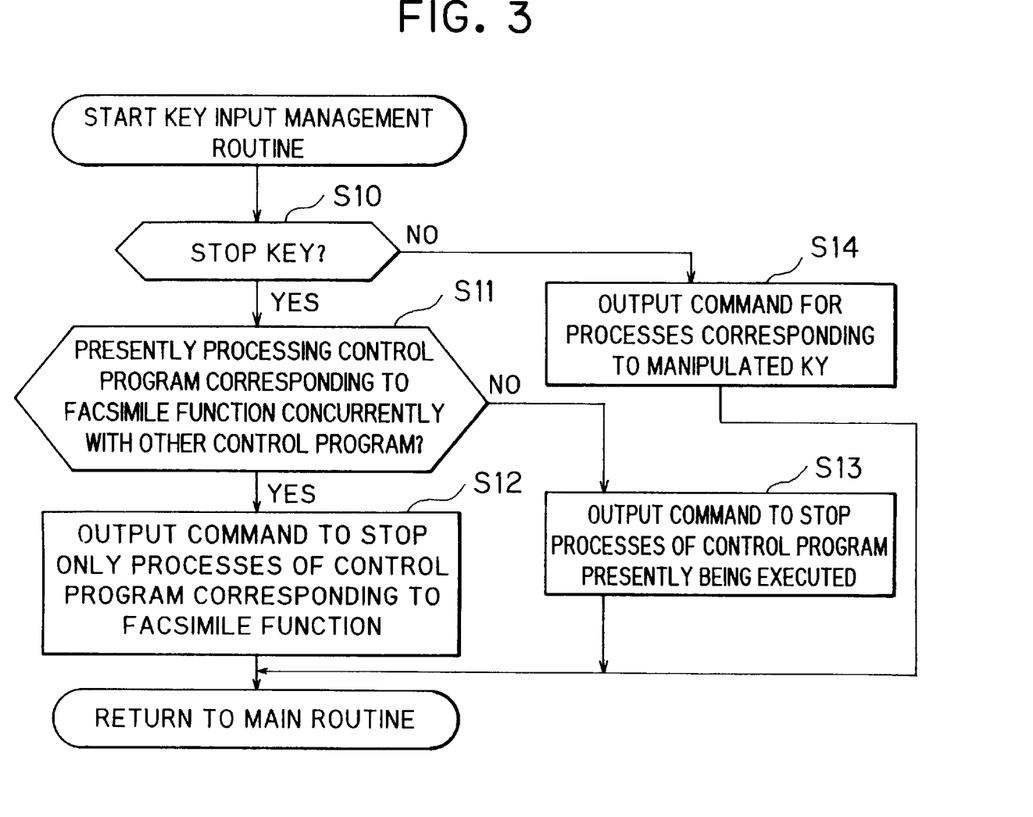
FIG. 3 is a flowchart representing a key input management routine performed by the multi-function peripheral device of FIG. 1.

Next, while referring to the flowchart shown in FIG. 3, an explanation will be provided for a key input management routine of the key input management control program. The key input management control program is executed when a key of the keyboard 4 is manipulated while a plurality of the control programs of the functions are concurrently processed using time sharing methods. In the flowchart, Si (i=10, 11, . . . i) indicates individual steps.

At the start of the key input management routine, first whether or not the manipulated key is the stop key is determined based on code data of the key inputted from the input/output ASIC 22 via the common bus 16. When the manipulated key is not the stop key (S10:NO), then in S14, processes corresponding to commands from the manipulated key are executed. Then, the routine is ended and the program returns to the main routine. On the other hand, when the manipulated key is the stop key (S10:YES), then in S11, whether or not the control program for the facsimile function is being concurrently processed with the control program of any of the supplementary functions is determined. If more than one control program is being concurrently processed (S11:YES), then a command is outputted to stop processes only for the control programs of the facsimile function, because the facsimile functions is set with a higher priority than the other functions in S12. Then, this routine is ended.

When the stop key is manipulated (S10:YES), but only a single control program for a single function is being executed (S11:NO), then in S13, the command is outputted to stop processes relating to the control program presently being executed. Then, this routine is ended.

It should be noted that S11 and S12 can be modified so that in S11 it is determined whether any two or more control programs, that is, not necessarily including the control program for the facsimile function, are being concurrently processed. In this case, in S12 processes can be performed to determine which control program corresponds to the function assigned with highest priority and then that control program can be stopped. For example, when the control program for the copy function is being processed concurrently with the control program for the print function, then in S12 processes can be performed to determine that the control program for the copy function should be stopped, because the copy function is assigned a higher priority level than the print function.

Figure 5:
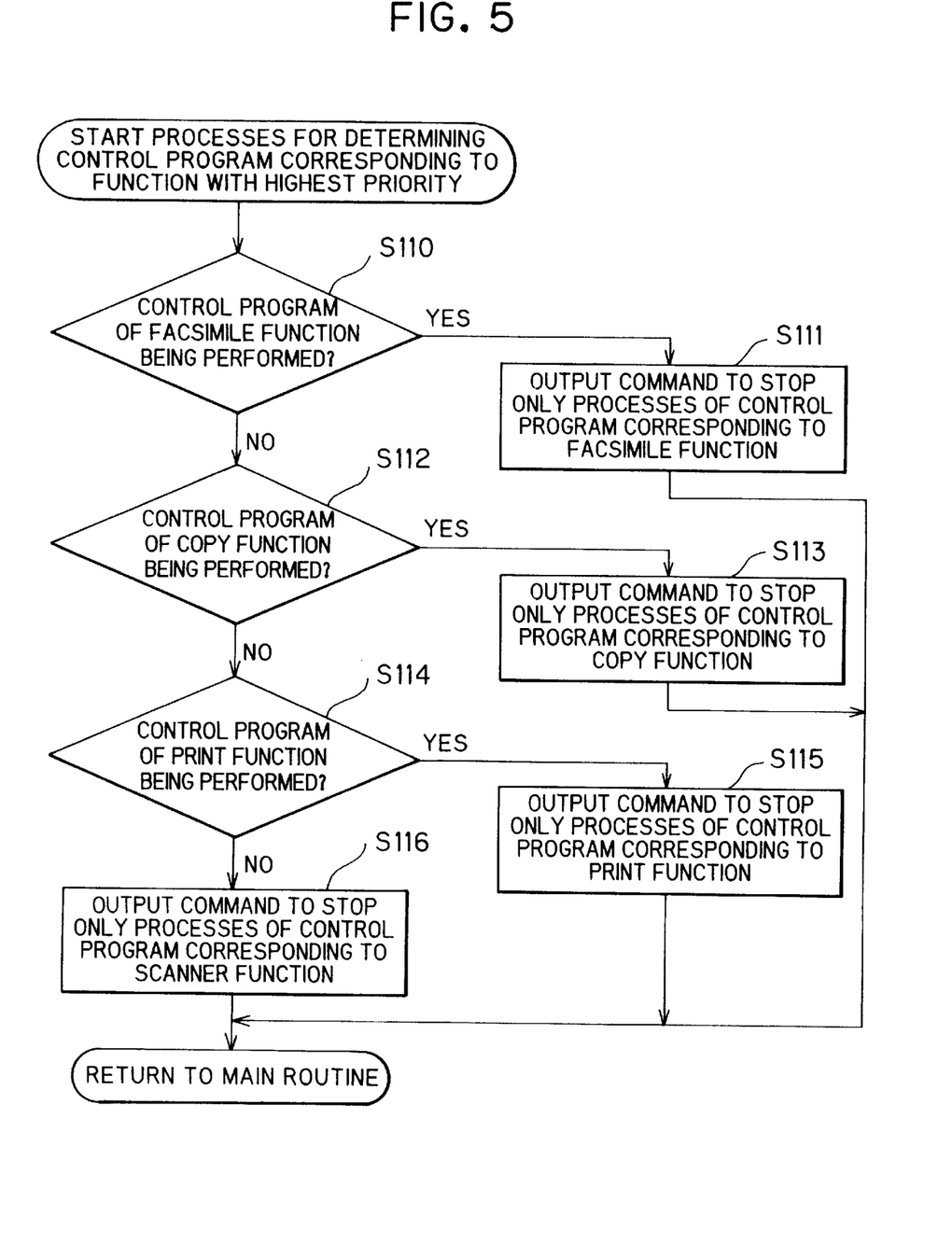
FIG. 5 is a flowchart showing a method for determining which control program corresponds to the function with the highest priority.

Next, the processes performed in this modified S12, that is, processes for determining which control program of concurrently processed control programs corresponds to the function assigned with the highest priority, will be explained while referring to the flowchart of FIG. 5.

First, in S110, it is determined whether or not one of the concurrently processed control programs corresponds to the facsimile function. If so (S110:YES), then in S111, a command is outputted to stop processes only for the control programs of the facsimile function, because the facsimile functions is set with a higher priority than any of the other functions. Then, this routine is ended.

If none of the concurrently processed control programs corresponds to the facsimile function (S110:NO), then in S112, it is determined whether or not one of the concurrently processed control programs corresponds to the copy function. If so (S112:YES), then in S113, a command is outputted to stop processes only for the control programs of the copy function, because the copy function is assigned with a next highest priority. Then, this routine is ended.

If none of the concurrently processed control programs corresponds to the copy function (S112:NO), then in S114, it is determined whether or not one of the concurrently processed control programs corresponds to the print function. If so (S114:YES), then in S114, a command is outputted to stop processes only for the control programs of the print function. Then, this routine is ended.

If none of the concurrently processed control programs corresponds to the print function (S114:NO), then in S116, a command is outputted to stop processes only for the control programs of the scanner function. Then, this routine is ended.

In this way, the control program corresponding to the function with the highest priority can be determined.

Figure 6:
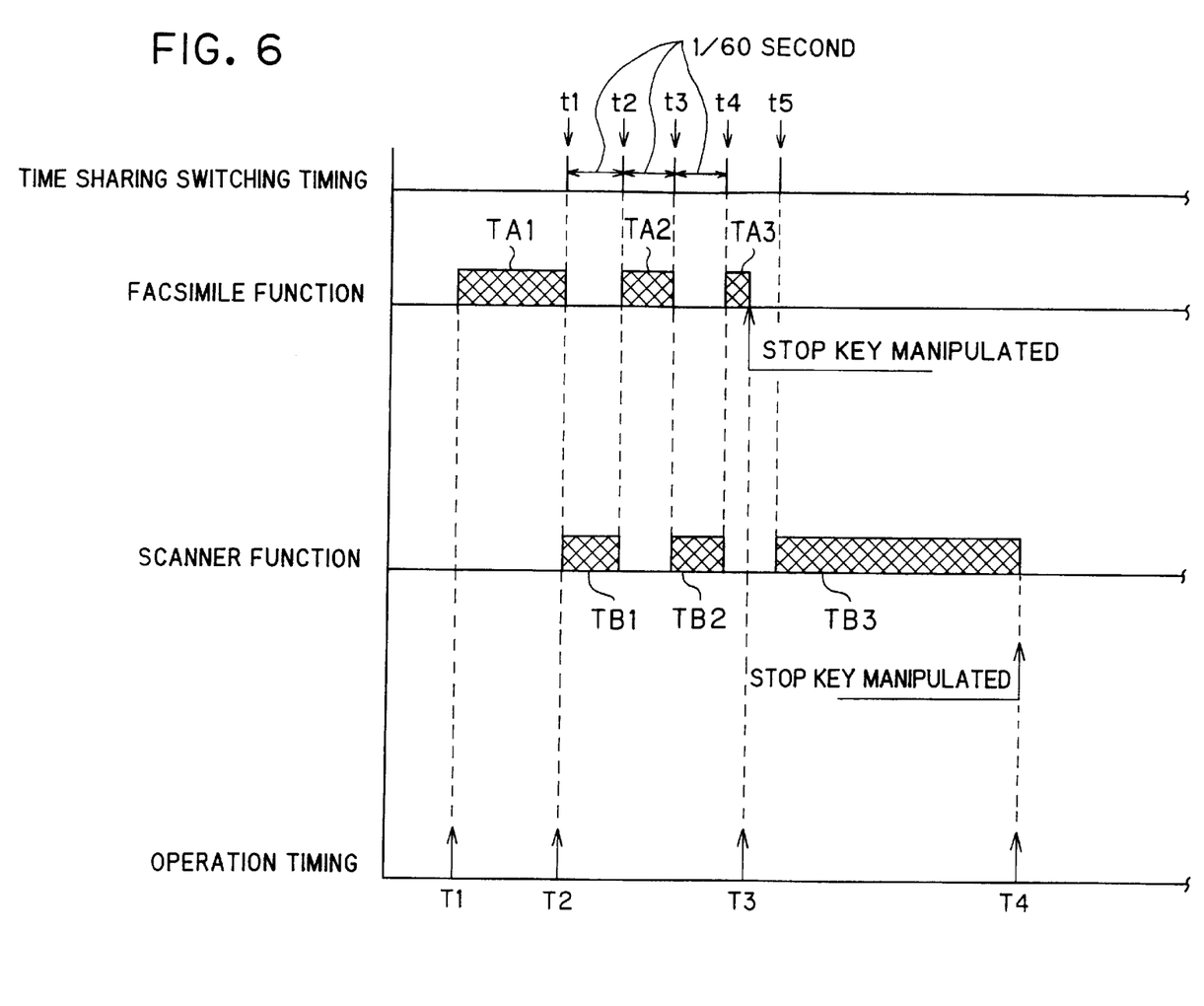
FIG. 6 is a timing chart showing timing of processes performed for a facsimile function and a scanner function.

Next, while referring to the time chart in FIG. 6, an explanation will be provided for operations performed when the stop key is manipulated while a control program for the memory transmission function, which is a part of the facsimile function, is being concurrently processed using time sharing processes with control programs for the scanner function.

At timing T1, the memory transmission function is started up and processes for transmitting image information are started. That is, from timing T1, the memory transmission process TA1 is executed and, as shown in FIG. 4, at timing T1, the message "PERFORMING MEMORY TRANSMISSION" is displayed on the display region 3a. In this example, while the memory transmission process TA1 is being executed, the scanner function for transmitting image information retrieved from an original document by the scanner device 6 to the personal computer 8 is started up at timing T2. From this timing T2 on, the memory transmission processes TA and the scanner processes TB are concurrently processed using time sharing methods. As a result, from time T2 on, the message "PERFORMING IMAGE TRANSMISSION" is displayed on the display region 3b as shown in FIG. 4.

After timing T2, the scanner processes TB1, TB2, TB3, . . ., and the memory transmission processes TA2, TA3, . . . are performed in alternation each 1/60 of a second at a time sharing switching timings t1, t2, t3, . . . using time sharing methods. At timing T3, the user manipulates the stop key on the operation panel. As a result, process operations for the control program of the memory transmission function, which is set with higher priority than the scanner function, are stopped. At timing T4, the user again manipulates the stop key. Because the control program for the scanner function is the only control program presently being executed, processing operations for the control program of the scanner function are stopped.

As described above, the multi-function information processing device 1 includes a single computer 10 and a control panel 2, which is used commonly for a plurality of functions. The ROM 12 of the computer 10 stores a plurality of control programs corresponding to a plurality of functions such as a facsimile function, a print function, and a scanner function. The multi-function information processing device 1 can simultaneously execute the plurality of functions by concurrently processing the plurality of control programs using time sharing methods. When the stop key on the keyboard 4 of the operation panel 2 is manipulated while a plurality of the control programs are being concurrently processed, a command is outputted for stopping process operations of the control program that has the highest priority setting of those control programs presently being executed. In this way, by merely manipulating the stop key, a stop command can be validated by giving priority to control programs corresponding to the facsimile function that has the highest priority setting.

While the invention has been described in detail with reference to specific embodiments thereof, it would be apparent to those skilled in the art that various changes and modifications may be made therein without departing from the spirit of the invention, the scope of which is defined by the attached claims.

For example, an order of priority can be set to the plurality of processes within the facsimile function, such as the image retrieval transmission process and the image reception recording process. Further, the present invention can be applied to a variety of different electronic devices. For example, the present invention can be applied to electronic devices provided with a plurality of computation units that use multi-function concurrent processing to simultaneously execute a plurality of functions such as computation processes and information input/output processes.

The present embodiment described the present invention applied to the stop key. However, the present invention can be applied to other keys commonly used for a plurality of functions. For example, the present invention can be applied to keys of the ten-key pad. In this case, priority order to functions is assigned based on order in which the functions are started. For example, when the ten-key pad is used to input a telephone number for the facsimile function before it is used to input a number of copies for the copy function, then commands for the control program of the facsimile function are validated because the facsimile function was started before the copy function.

What is claimed is:

1. A multi-function concurrent processing device for performing a plurality of functions by using time sharing methods to concurrently process at least two of a plurality of control programs, which correspond to the plurality of functions, the plurality of functions being assigned with a priority order, the multi-function concurrent processing device comprising:

an operation panel for accessing the plurality of functions, the operation panel having a predetermined key commonly used for the plurality of functions;

a determination unit that determines whether at least two of the plurality of control programs are being concurrently processed; and a key validation unit that, when the predetermined key of the operation panel is operated while the determination unit determines that at least two of the plurality of control programs are being concurrently processed, allows implementation of commands from the predetermined key only for a control program of a function having a highest priority in the priority order than any other function of the at least two of the plurality of control programs.

2. A multi-function concurrent processing device as claimed in claim 1, further comprising an image retrieval unit that retrieves image information from an original; and wherein the multi-function concurrent processing device includes at least:

a facsimile function that operates at least one of the image retrieval unit and a recording unit to transit and/or receive image information over a transmission line; and a scanner function that transmits image information retrieved by the retrieval unit to an external device.

3. A multi-function concurrent processing device as claimed in claim 2, wherein the facsimile function is assigned with a priority higher than priority of the scanner function.

4. A multi-function concurrent processing device as claimed in claim 3, wherein the a recording unit records image information on a recording medium; and wherein the multi-function concurrent processing device further includes at least a print function that uses the recording unit to print data received from an external device.

5. A multi-function concurrent processing device as claimed in claim 4, wherein the facsimile function is assigned with a priority higher than priority of the print function.

6. A multi-function concurrent processing device as claimed in claim 1, further comprising a recording unit that records image information on a recording medium; and wherein the multi-function concurrent processing device includes at least:

a facsimile function that operates at least one of the image retrieval unit and the recording unit to transit and/or receive image information over a transmission line; and a print function that uses the recording unit to print data received from an external device.

7. A multi-function concurrent processing device as claimed in claim 6, wherein the facsimile function is assigned with a priority higher than priority of the print function.

8. A multi-function concurrent processing device as claimed in claim 1, wherein the predetermined key is a key for stopping the control program of the function having the highest priority in the priority order.

9. A multi-function concurrent processing device as claimed in claim 8, further comprising a single central control unit, the multi-function concurrent processing device being for simultaneously performing at least two of the plurality of functions by the central control unit concurrently processing corresponding ones of the plurality of control programs using time sharing.

10. A multi-function concurrent processing device as claimed in claim 1, further comprising a single central control unit, the multi-function concurrent processing device being for simultaneously performing at least two of the plurality of functions by the central control unit concurrently processing corresponding ones of the plurality of control programs using time sharing.

11. A multi-function concurrent processing device as claimed in claim 1, further comprising a display for displaying message relating to control programs presently being processed, the display displaying messages relating to the control program of the function having the highest priority above messages relating to the any other function of the at least two of the plurality of control programs.

12. A multi-function concurrent processing device for performing a plurality of functions by using time sharing methods to concurrently process at least two of a plurality of control programs, which correspond to the plurality of functions, each of the plurality of functions being assigned with a priority level of a priority order, the multi-function concurrent processing device comprising:

an operation panel having a predetermined key commonly used for the plurality of functions;

a determination unit that determines whether at least two of the plurality of control programs are being concurrently processed; and a control unit that, when the predetermined key of the operation panel is operated while the determination unit determines that at least two of the plurality of control programs are being concurrently processed, executes commands from the predetermined key for a one of the at least two of the plurality of control programs corresponding to a function assigned with a highest priority level of priority levels assigned to all functions corresponding to the at least two of the plurality of control programs.

* * * * *